(12) United States Patent
Lin et al.

(10) Patent No.: US 11,847,807 B2
(45) Date of Patent: Dec. 19, 2023

(54) IMAGE PROCESSING SYSTEM AND PROCESSING METHOD OF VIDEO STREAM

(71) Applicant: GENESYS LOGIC, INC., New Taipei (TW)

(72) Inventors: Wen-Hsiang Lin, New Taipei (TW); Sheng-Yuan Lin, New Taipei (TW); Mi-Lai Tsai, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 0 days.

(21) Appl. No.: 17/829,377

(22) Filed: Jun. 1, 2022

(65) Prior Publication Data

US 2023/0005235 A1    Jan. 5, 2023

Related U.S. Application Data

(60) Provisional application No. 63/217,770, filed on Jul. 2, 2021.

(30) Foreign Application Priority Data

Jan. 4, 2022   (TW) .................................. 111100227

(51) Int. Cl.
   *G06V 10/25*        (2022.01)
   *H04N 23/698*       (2023.01)
   (Continued)

(52) U.S. Cl.
   CPC ............ *G06V 10/243* (2022.01); *G06T 5/006* (2013.01); *G06V 10/25* (2022.01); *H04N 5/2628* (2013.01);
   (Continued)

(58) Field of Classification Search
   CPC ...... G06V 10/243; G06V 10/25; G06T 5/006; G06T 2207/10016; H04N 5/2628; H04N 23/698
   See application file for complete search history.

(56) References Cited

U.S. PATENT DOCUMENTS

2016/0112652 A1*   4/2016   David .................. H04N 23/815
                                                    348/239
2017/0163930 A1*   6/2017   Seo ........................ G11B 20/10
                          (Continued)

FOREIGN PATENT DOCUMENTS

| CN | 104822088 | 8/2015 |
|----|-----------|--------|
| CN | 106488145 | 3/2017 |
| TW | 200723165 | 6/2007 |

OTHER PUBLICATIONS

"Office Action of Taiwan Counterpart Application", dated Sep. 27, 2022, p. 1-p. 9.

*Primary Examiner* — Thai Q Tran
*Assistant Examiner* — Jose M Mesa
(74) *Attorney, Agent, or Firm* — JCIPRNET

(57) ABSTRACT

An image processing system and a processing method of video stream are provided. The first image is obtained according to a parameter. The deformation correction procedure is performed on the first image, and the second image is generated. The identification detection procedure is performed on the second image, and a detected result is generated. Control information is generated according to the detected result. The parameter is adjusted according to the control information, and a third image is generated. The second image and the third image are output. Therefore, the subsequent application could be enhanced through the dual image outputs.

20 Claims, 5 Drawing Sheets

(51) Int. Cl.
   *G06V 10/24*   (2022.01)
   *G06T 5/00*    (2006.01)
   *H04N 5/262*   (2006.01)

(52) U.S. Cl.
   CPC .. *G06T 2207/10016* (2013.01); *H04N 23/698* (2023.01)

(56) References Cited

U.S. PATENT DOCUMENTS

| | | |
|---|---|---|
| 2018/0025507 A1 | 1/2018 | Hufnagel et al. |
| 2018/0089795 A1* | 3/2018 | Song ..................... G06T 3/0018 |
| 2019/0295271 A1* | 9/2019 | Xu ........................ G06V 40/169 |
| 2021/0390729 A1* | 12/2021 | Fox-Roberts ........... G06T 5/006 |

* cited by examiner

IMAGE PROCESSING SYSTEM AND PROCESSING METHOD OF VIDEO STREAM

CROSS-REFERENCE TO RELATED APPLICATION

This application claims the priority benefit of U.S. provisional application Ser. No. 63/217,770, filed on Jul. 2, 2021, and Taiwan application serial no. 111100227, filed on Jan. 4, 2022. The entirety of each of the above-mentioned patent applications is hereby incorporated by reference herein and made a part of this specification.

BACKGROUND

Technical Field

The disclosure relates to an image processing technology, and more particularly, to an image processing system and a processing method of video stream.

Related Art

In the prior art, although a camera equipped with a wide-angle lens or a fisheye lens may capture an image with a wider field of view (FoV), the edge of the image may be curved and gives an unnatural appearance. Distortions in wide-angle or fisheye images may make their content difficult to read, and are more likely to cause discomfort to the user's eyes.

A conventional fisheye or wide-angle camera will transmit the panoramic image to a back-end system (such as a host or computer) having stronger computing power to handle de-warping, detection, and display of a de-warped image together. However, the complexity of the back-end device is high and the application situation of the camera is limited.

SUMMARY

In view of this, embodiments of the disclosure provide an image processing system and a processing method of video stream capable of dual video streaming for detection and display applications respectively.

The processing method of video stream according to the embodiments of the disclosure includes (but is not limited to) the following steps. A first image is obtained according to a parameter. A deformation correction procedure is performed on the first image, and a second image is generated. An identification detection procedure is performed on the second image, and a detected result is generated. A control information is generated according to the detected result. The parameter is adjusted according to the control information, and a third image is generated. The second image and the third image are output.

The image processing system according to the embodiments of the disclosure includes (but is not limited to) a controller. The controller is configured to obtain a first image according to a parameters; perform a deformation correction procedure on the first image and generate a second image; adjust the parameter according to a control information and generate a third image; and output the second image and the third image. The control information is generated according to the detected result generated by performing the identification detection procedure on the second image.

Based on the above, according to the image processing system and the processing method of video stream according to the embodiments of the disclosure, through the deformation correction procedure, two types of images can be respectively generated which are carried by two video streams and used for different back-end applications, thereby allowing for an effective division of labor and improvement in the structural flexibility.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
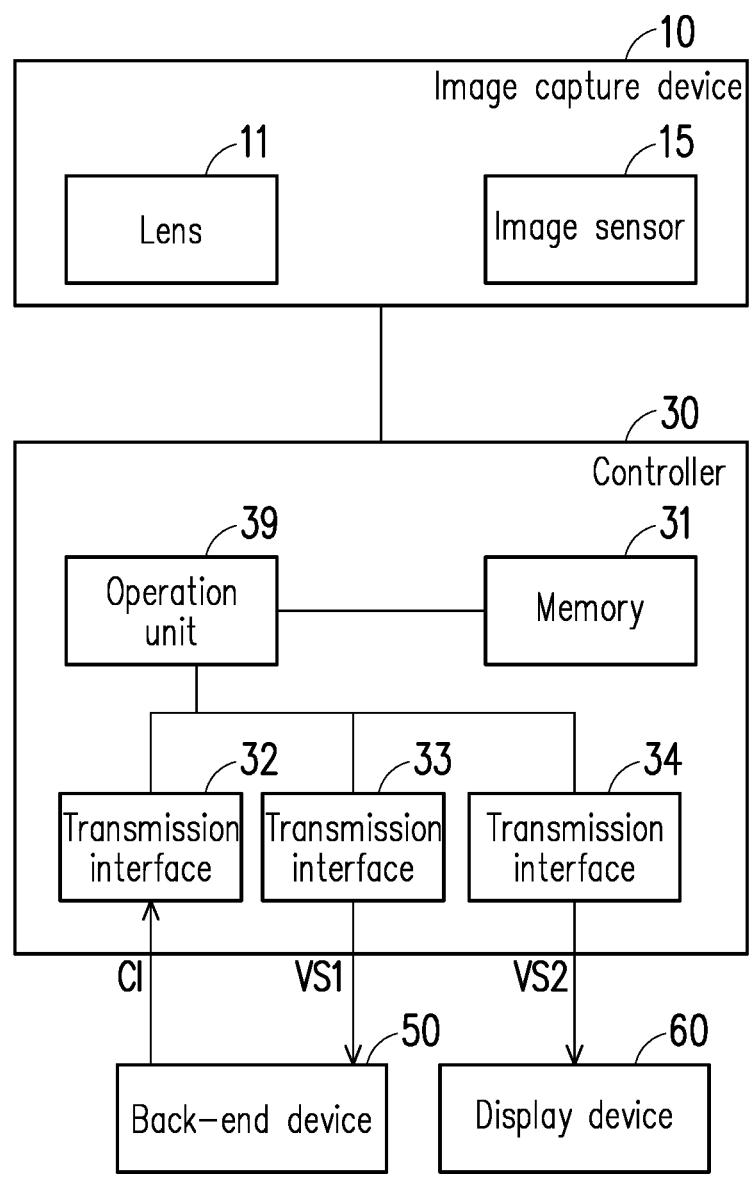
FIG. 1 is a block diagram of components of an image processing system according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a block diagram of components of an image processing system 1 according to an embodiment of the disclosure. Referring to FIG. 1, the image processing system 1 includes (but is not limited to) an image capture device 10, a controller 30, a back-end device 50 and a display device 60.

The image capture device 10 may be a camera, a video camera, a monitor, or a device having similar function. The image capture device 10 may include (but is not limited to) a lens 11 and an image sensor 15 (such as a charge coupled device (CCD) or a complementary metal-oxide-semiconductor (CMOS), or the like). In one embodiment, an image may be captured through the lens 11 and the image sensor 15. For example, light is imaged on the image sensor 15 through the lens 11.

In some embodiments, the specifications of the image capture device 10 (such as imaging aperture, magnification, focal length, imaging viewing angle, size of the image sensor 15, or the like) and the number thereof may be adjusted according to actual needs. For example, the lens 11 is a fish-eye or wide-angle lens, and generates a fish-eye image or a wide-angle image accordingly.

The controller 30 may be coupled to the image capture device 10 through a camera interface, I2C, and/or other transmission interfaces. The controller 30 includes (but is not limited to) a memory 31, transmission interfaces 32, 33, 34 and an operation unit 39.

The memory 31 may be any type of fixed or removable random access memory (RAM), read only memory (ROM), flash memory, conventional hard disk drive (HDD), solid-state drive (SSD), or similar components. In one embodiment, the memory 31 is configured to store codes, software modules, configuration, data or files.

The transmission interfaces 32, 33, and 34 may be camera interfaces, I2C, or other transmission interfaces. For example, a transmission interface 32 is an I2C interface, the transmission interface 33 is a mobile industry processor interface (MIPI), and the transmission interface 34 is a universal serial bus (USB) interface. For another example, the transmission interface 33 is a digital parallel bus (DPS) interface, a low-voltage differential signalling (LVDS) interface, a high-speed serial pixel (HiSPi) interface, or a V-by-One interface. In one embodiment, the transmission interfaces 32, 33, and 34 are configured to be connected to external devices. For example, the transmission interfaces 32 and 33 are connected to the back-end device 50, and the transmission interface 34 is connected to the display device 60.

The operation unit 39 is coupled to the memory 31 and the transmission interfaces 32, 33 and 34. The operation unit 39 may be an image processor, a graphic processing unit (GPU), other programmable general-purpose or special-purpose microprocessors, digital signal processors (DSP), programmable controllers, field programmable gate arrays (FPGA), application-specific integrated circuits (ASIC), other similar components, or combinations of the above components. In one embodiment, the operation unit 39 is configured to execute all or part of the operations of the controller 30, and may load and execute each code, software module, file and data stored in the memory 31.

The back-end device 50 and the display device 60 may be a desktop computer, a notebook computer, a server, a smart phone, or a tablet computer. In one embodiment, the back-end device 50 is configured to calculate and/or detect images. In one embodiment, the display device 60 is configured to display images. In some embodiments, the functions of back-end device 50 and/or the display device 60 may be implemented on a microcontroller, chip, SoC, or system.

Figure 2:
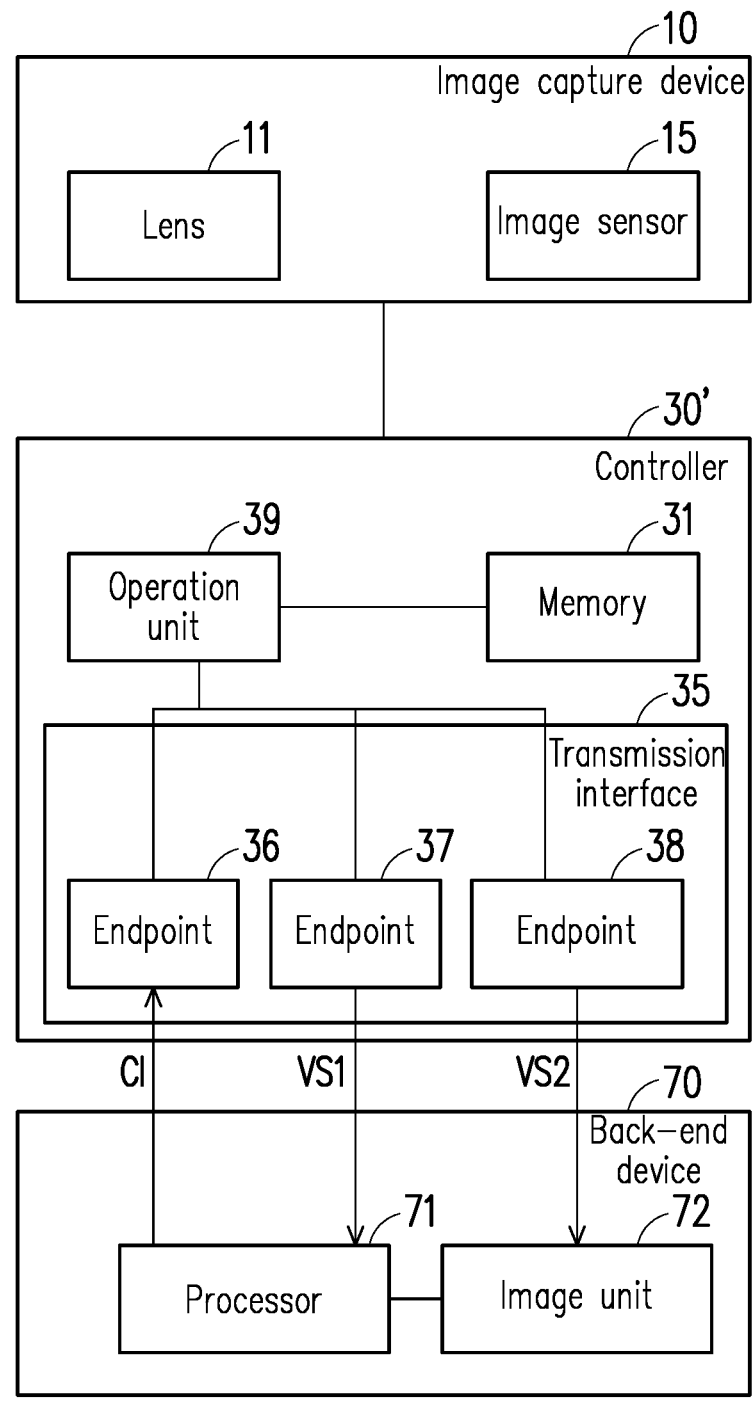
FIG. 2 is a block diagram of components of an image processing system according to another embodiment of the disclosure.

FIG. 2 is a block diagram of components of an image processing system 2 according to another embodiment of the disclosure. Referring to FIG. 2, the difference between a controller 30' of this embodiment and the controller 30 of FIG. 1 is that the controller 30' includes a transmission interface 35, and the operation unit 39 is coupled to the transmission interface 35. The transmission interface 35 may be a USB interface and provides endpoints 36, 37, 38. It is worth mentioning that the endpoints 36, 37, and 38 in this embodiment are configured to be connected to a back-end device 70, wherein the endpoints 36 and 37 are configured to be connected to a processor 71 of the back-end device 70, and the endpoint 38 is configured to be connected to an image unit 72 of the back-end device 70.

The back-end device 70 may be a desktop computer, a notebook computer, a server, a smart phone or a tablet computer. The processor 71 may be an image processor, a GPU, other programmable general-purpose or special-purpose microprocessors, digital signal processors, programmable controllers, field programmable logic gate arrays, application-specific integrated circuits, other similar components, or combinations of the above components. The image unit 72 may be a processing circuit or a control circuit for image output/display/play.

Hereinafter, the method according to the embodiment of the disclosure will be described in conjunction with various devices, components and modules in the image processing system 1 or the image processing system 2. Each process of the method may be adjusted according to the implementation situation, and the disclosure is not limited thereto.

Figure 3:
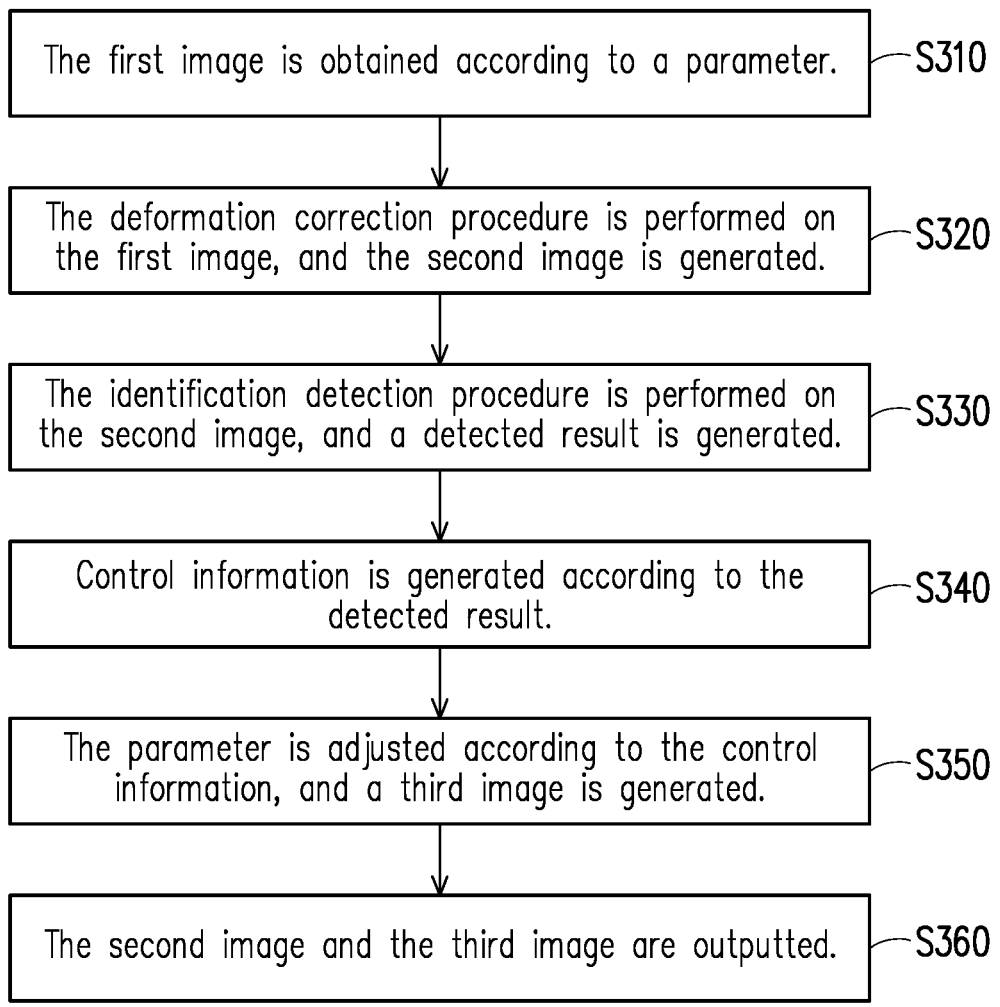
FIG. 3 is a flowchart of a processing method of video stream according to an embodiment of the disclosure.

FIG. 3 is a flowchart of a processing method of video stream according to an embodiment of the disclosure. Referring to FIG. 3, the controllers 30, 30' obtain a first image according to a parameter (step S310). The parameter includes the setting parameter for de-warping, panning, tilting, zooming, rotating, shifting, and/or field of view (FoV) adjusting. In one embodiment, the parameter is a setting parameter for the image capture device 10 or other external image capture devices to perform image capture operations. For example, the controllers 30, 30' may send a command or a message to the image capture device 10 or other external image capture devices, and the command or message are related to the setting parameter. For example, changing the image capture range. The image capture device 10 or other external image capture devices may perform image capture operations according to the setting parameter to obtain images.

In one embodiment, the controllers 30, 30' obtain the first image from the image capture device 10. Specifically, the first image is an image captured by the image capture device 10 or other external image capture devices on one or more target objects. In one embodiment, the target object is a human body. In some embodiments, the first image aims at the upper body of a person (such as waist, shoulders, or above the chest). In other embodiments, the target object may be various types of organisms or non-living organisms. The controllers 30, 30' may obtain the first image captured by the image capture device 10 through the camera interface and/or I2C.

The controllers 30, 30' perform a deformation correction procedure on the first image, and generate a second image (step S330). The deformation correction procedure is configured to adjust the deformation in the first image. In one embodiment, the deformation correction procedure may be de-warping, panning, tilting, zooming, rotating, shifting, and/or field of view adjusting.

In one embodiment, the image sensor 15 may output raw data of the first image (such as sensing intensities of a plurality of primary colors) to controllers 30, 30'. The controllers 30, 30' may process the raw data according to an image signal processing (ISP) procedure, and output a visible full-color image to the deformation correction procedure.

In another embodiment, the image sensor 15 may output YUV or other color-coded data of the first image to the controllers 30, 30'. The controllers 30, 30' may ignore or disable the processing of the color-coded data by the ISP procedure (i.e. skip the ISP procedure for the color-coded data), and directly perform the deformation correction procedure on the color-coded data.

In one embodiment, the first image is a wide-angle image or a fisheye image, and the controllers 30, 30' may generate a de-warped panoramic image (i.e. the second image) through a deformation correction procedure. This panorama may be used for subsequent detection of one or more target objects. For example, panoramas may be configured to detect faces, gestures or body parts. In another embodiment, the controllers 30, 30' may turn the viewing angle of the first image in any axis, zoom in all or part of the region, shift in all or part of the region, and/or adjust the size of the viewing angle to generate the second image.

In one embodiment, the controller 30 may transmit the second image to the back-end device 50 through the transmission interface 33, and the controller 30' may transmit the second image to the processor 71 of the back-end device 70 through the endpoint 37. For example, the controllers 30, 30' may output the second image through a first video stream VS1.

The back-end device 50 or the processor 71 performs an identification detection procedure (or called an object detection procedure) on the second image, and generates a detected result (step S330). The identification detection procedure is, for example, to determine, in the second image, one or more regions of interest (RoI) (or bounding boxes, or bounding rectangles) or pinots (which may be located on the target object's outline, center, or anywhere thereon) corresponding to the target object (such as a person, an animal, a non-living body or part thereof), so as to identify the type of the target object (e.g. whether it is a person, male or female, dog or cat, table or chair, or the like).

In one embodiment, the detected result is related to one or more regions of interest (RoI) (or bounding boxes, or bounding rectangles) in the second image. For example, the identification detection procedure may determine a region of interest in the second image corresponding to the target object, and the region of interest may frame all or part of the target object.

The back-end device 50 or the processor 71 generates control information CI according to the detected result (step S340). The control information is related to the detected result of the second image. The detected result is, for example, recognizing one or more faces, gestures, body parts, or other target objects in the second image (i.e. object detection), or, for example, determining the position/motion of one or more target objects (i.e. object tracking). In one embodiment, the control information is parameter adjustment for the deformation correction procedure based on the detected result. For example, the position of the face in the image is configured to set the turning angle of the viewing angle in the deformation correction procedure. For another example, the size of the human face in the image is configured to set the area magnification in the deformation correction procedure.

In one embodiment, the back-end device 50 may transmit the control information CI to the controller 30 through the transmission interface 32, and the processor 71 may transmit the control information CI to the controller 30' through the endpoint 36.

The controllers 30, 30' adjust the parameter according to the control information, and generate a third image (step S350). For example, the controllers 30, 30' generate a command or a message related to the setting parameter of the image capture device 10 according to the control information, and accordingly capture the first image again through the image capture device 10. In one embodiment, the controllers 30, 30' obtain the first image captured again, adjust the first image through the deformation correction procedure according to the control information CI, and generate the third image.

In one embodiment, the third image includes one or more windows. That is, the third image is divided into one or more windows. The controllers 30, 30' may arrange one or more regions of interest into these windows. For example, the controllers 30, 30' zoom the region of interest in the panorama to fit the size of the designated window, and displace the zoomed region of interest (by, for example, panning, tilting, rotating, panning and/or viewing angle adjusting) to the window.

Figure 4:
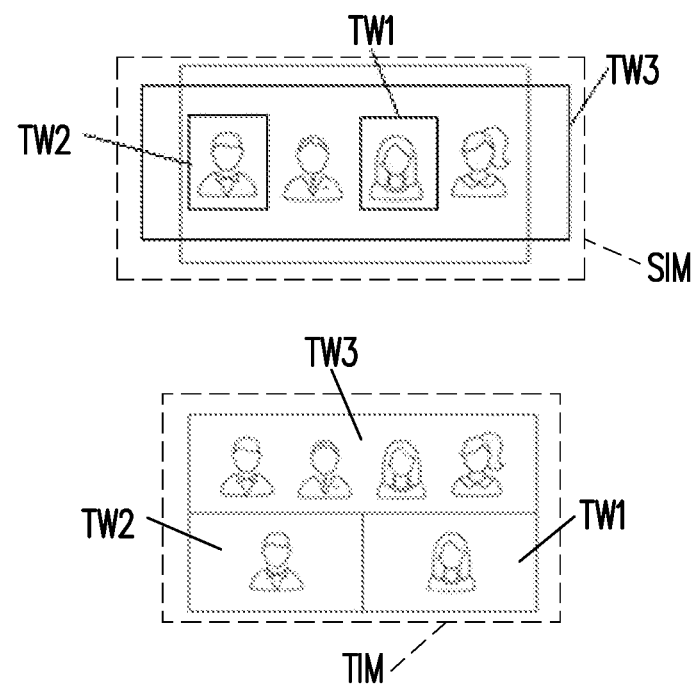
FIG. 4 is an example illustrating a multi-window preview.

For example, FIG. 4 is an example illustrating a multi-window preview. Referring to FIG. 4, the controllers 30, 30' divide a third image TIM (shown at the bottom of the diagram) into three windows TW1, TW2 and TW3. The window TW3 is captured from four people in a first image SIM (as shown at the top of the figure), and the windows TW1 and TW2 are captured from only one person in the first image SIM, respectively.

In one embodiment, the controllers 30, 30' may output the second image and the third image simultaneously or time-divisionally through the deformation correction procedure. For example, the controllers 30, 30' may generate a first third image according to the detected result of a first second image. Next, the controllers 30, 30' may output the second image and the third image (step S360). For example, the controllers 30, 30' generate the second image and the third image in sequence through time-division multiplexing. More specifically, after the controllers 30, 30' generate the first second image, the third image is then generated according to the detected result of the second image. Furthermore, the controllers 30, 30' of the disclosure may output the second image and the third image simultaneously or in time division; the disclosure does not limit the output timing.

In one embodiment, the controllers 30, 30' may output the second image through the first video stream VS1, and output the third image through a second video stream VS2. Specifically, the second video stream is different from the first video stream. The first video stream VS1 carries the second image, and the second video stream VS2 carries the third image. That is to say, the controllers 30, 30' may provide the output of dual video streaming. In addition, the two video streams may or may not be output to an external device at the same time, depending on the computing speed.

In one embodiment, taking the structure of FIG. 1 as an example, the operation unit 39 outputs the first video stream VS1 through the transmission interface 33, outputs the second video stream VS2 through the transmission interface 34, and inputs the control information CI through the transmission interface 32. For example, the MIPI outputs the first video stream VS1, one endpoint of the USB interface outputs the second video stream VS2, and the I2C interface inputs the control information CI.

In another embodiment, taking the structure of FIG. 2 as an example, the operation unit 39 outputs the first video stream VS1 through the endpoint 37 of the transmission interface 35, outputs the second video stream VS2 through the endpoint 38, and inputs the control information CI through the endpoint 36. For example, the first video stream VS1 and the second video stream VS2 are output through two endpoints of the USB interface, and the control information CI is input through another endpoint.

Figure 5:
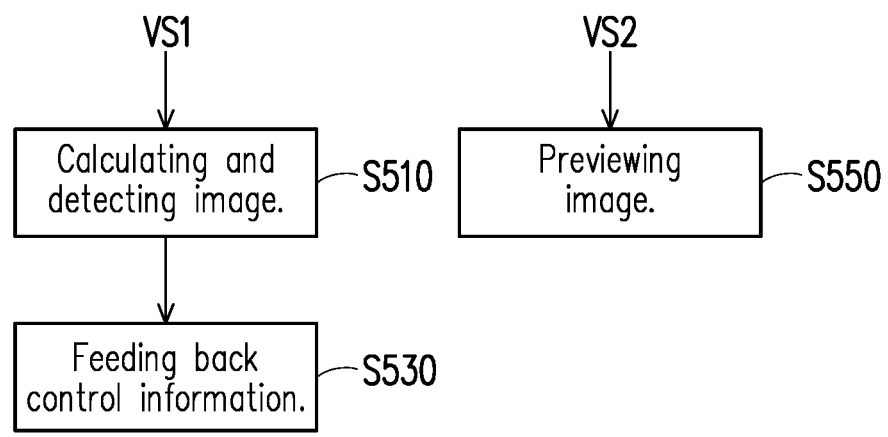
FIG. 5 is a flowchart of an application of dual video streaming according to an embodiment of the disclosure.

The applications of the first video stream VS1 and the second video stream VS2 may be different. FIG. 5 is a flowchart of an application of dual video streaming according to an embodiment of the disclosure. Referring to both FIG. 1 and FIG. 5, in one embodiment, the first video stream VS1 is output to the back-end device 50, and the back-end device 50 performs an identification detection procedure on the first video stream VS1 (i.e. calculating and detecting the second image) (step S510) to generate a detected result. The identification detection procedure may be the aforementioned object detection and/or tracking. Moreover, the back-end device 50 may generate the control information CI according to the detected result. It should be noted that, for the detected result and the control information CI, reference can be made to the descriptions of steps S330 and S340, which will not be repeated here. The back-end device 50 may further feed back the control information CI to the controllers 30, 30' (step 530), such that the controllers 30, 30' may generate the third image according to the control information CI. Similarly, in the implementation structure of FIG. 2, the processor 71 of the back-end device 70 further feeds back the control information CI to the controller 30' (step 530), such that the controller 30' may generate the third image according to the control information CI.

In one embodiment, the second video stream VS2 is output to the display device 60, and the display device 60 displays the third image (i.e. image preview) carried by the second video stream VS2 through a display procedure (step S550). Taking FIG. 4 as an example, the third image TIM is used for multi-window preview and display. Note that the isochronous mode and the bulk mode provided by USB video device class or UVC may allow the display device 60 to display the third image in real time. However, the embodiments of the disclosure may still adopt other related protocols for real-time video output.

To sum up, the image processing system and the processing method of video stream according to the embodiments of the disclosure provides a dual video streaming. One video stream may allow detection of faces, gestures, or body parts, and control another video stream to provide display of de-warped multiple regions of interest image.

The embodiments of the disclosure provide a flexible architecture and are widely applicable (for example, applicable to different types of video-related products). The system of the embodiments of the disclosure allows for an effective division of labor. For example, the back-end or computer system may be responsible for the detection of faces, gestures, or body parts, and the display device or system may be responsible for display of de-warped multiple regions of interest image. Thereby, manufacturers of ordinary cameras can easily upgrade their products to fisheye or wide-angle cameras, and provide multi-target detection and tracking functions for faces, gestures, or body parts, or the like.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A processing method of video stream, comprising:
obtaining a first image captured according to a parameter;
performing a deformation correction procedure on the first image and generating a second image;
performing an identification detection procedure on the second image and generating a detected result;
generating a control information according to the detected result;
adjusting the parameter according to the control information;
obtaining another first image captured according to the adjusted parameter;
adjusting the another first image through the deformation correction procedure according to the control information, and generating a third image; and
outputting the second image and the third image.

2. The processing method of video stream according to claim 1, comprising:
obtaining the first image from an image capture device;
performing the deformation correction procedure on the first image according to an image signal processing (ISP) procedure to generate the second image, wherein the deformation correction procedure is configured to adjust a deformation in the first image;
generating the third image through the deformation correction procedure according to the control information; and
outputting the second image and the third image are simultaneously, wherein the second image is output through a first video stream, and the third image is output through a second video stream, wherein the second video stream is different from the first video stream.

3. The processing method of video stream according to claim 2, further comprising:
generating the second image and the third image simultaneously through the deformation correction procedure.

4. The processing method of video stream according to claim 2, further comprising:
performing the identification detection procedure on the first video stream through a back-end device to generate the detected result, wherein the detected result is related to at least one region of interest (RoI) in the second image.

5. The processing method of video stream according to claim 4, further comprising:
arranging the at least one region of interest into at least one window, wherein the third image comprises the at least one window; and
displaying the third image through a display device.

6. The processing method of video stream according to claim 2, wherein outputting the second image through the first video stream and outputting the third image through the second video stream comprises:
outputting the first video stream through a mobile industry processor interface (MIPI), and outputting the second video stream through a universal serial bus (USB).

7. The processing method of video stream according to claim 2, wherein outputting the second image through the first video stream and outputting the third image through the second video stream comprises:
outputting the first video stream and the second video stream through two endpoints of a USB interface, respectively.

8. The processing method of video stream according to claim 7, further comprising:
inputting the control information through another endpoint of the USB interface.

9. The processing method of video stream according to claim 2, wherein the deformation correction procedure comprises de-warping, panning, tilting, zooming, rotating, shifting and field of view (FoV) adjusting, and the parameter comprises a setting parameter of at least one of de-warping, panning, tilting, rotating, zooming, rotating, shifting, and field of view adjusting.

10. The processing method of video stream according to claim 1, wherein the first image is a wide-angle image or a fisheye image, and the second image is a de-warped panoramic image.

11. An image processing system, comprising:
a controller, configured to:
obtain a first image captured according to a parameter;
perform a deformation correction procedure on the first image and generate a second image;
adjust the parameter according to a control information, wherein the control information is generated according to a detected result generated by performing an identification detection procedure on the second image;

obtain another first image captured according to the adjusted parameter;

adjust the another first image through the deformation correction procedure according to the control information, and generate a third image; and output the second image and the third image.

12. The image processing system according to claim 11, further comprising:

an image capture device, coupled to the controller and comprising a lens and an image sensor, and configured to capture the first image through the lens and the image sensor, wherein the controller is further configured to:

obtain the first image from an image capture device;

perform the deformation correction procedure on the first image according to an image signal processing procedure to generate the second image, wherein the deformation correction procedure is configured to adjust a deformation in the first image;

generate the third image through the deformation correction procedure according to the control information; and output the second image and the third image simultaneously, wherein the second image is output through a first video stream, and the third image is output through a second video stream, wherein the second video stream is different from the first video stream.

13. The image processing system according to claim 12, wherein the controller is further configured to:

generate the second image and the third image simultaneously through the deformation correction procedure.

14. The image processing system according to claim 12, further comprising:

a back-end device, coupled to the controller and configured to perform the identification detection procedure on the first video stream to generate the detected result, wherein the detected result is related to at least one region of interest in the second image.

15. The image processing system according to claim 14, wherein the detected result is related to the at least one region of interest in the second image, and the image processing system further comprises:

a display device, coupled to the controller, wherein the controller is further configured to:

arrange the at least one region of interest into at least one window, wherein the third image comprises the at least one window; and display the third image through the display device.

16. The image processing system according to claim 12, wherein the controller comprises:

a mobile industry processor interface, configured to output the first video stream; and a universal serial bus (USB), configured to output the second video stream.

17. The image processing system according to claim 12, wherein the controller comprises:

a USB interface, comprising two endpoints respectively configured to output the first video stream and the second video stream.

18. The image processing system according to claim 17, wherein the USB interface further comprises:

another endpoint, configured to input the control information.

19. The image processing system according to claim 12, wherein the deformation correction procedure comprises at least one of de-warping, panning, tilting, zooming, rotating, shifting, and field of view adjusting, and the parameter comprises a setting parameter of at least one of de-warping, panning, tilting, zooming, rotating, shifting, and field of view adjusting.

20. The image processing system according to claim 11, wherein the first image is a wide-angle image or a fisheye image, and the second image is a de-warped panoramic image.

* * * * *